United States Patent [19]

Borum et al.

[11] Patent Number: 4,837,914

[45] Date of Patent: Jun. 13, 1989

[54] CONVERSION ROOF FOR VANS

[75] Inventors: Otis C. Borum, Silver Springs; Martin O. Borum, Green Cove Springs; Robert H. Arn, Jacksonville, all of Fla.

[73] Assignee: A & S Fiberglass, Inc., Jacksonville, Fla.

[21] Appl. No.: 150,737

[22] Filed: Feb. 1, 1988

[51] Int. Cl.⁴ .............................................. B62D 25/06
[52] U.S. Cl. .................................. 29/401.1; 29/428; 296/210; 296/901
[58] Field of Search .................. 29/401.1, 428, 526.1; 296/210, 211, 215, 31 P

[56] References Cited

U.S. PATENT DOCUMENTS

| | | | |
|---|---|---|---|
| 3,475,048 | 10/1969 | McNamee | 296/31 P |
| 4,036,520 | 7/1977 | Zuidema | 296/157 |
| 4,231,144 | 11/1980 | Bernacchia, Jr. | 29/401.1 |
| 4,353,857 | 10/1982 | Ray et al. | 296/31 P |
| 4,491,362 | 1/1985 | Kennedy | 296/31 P |
| 4,575,148 | 3/1986 | Bieber | 29/401.1 |
| 4,627,655 | 12/1986 | Collins | 296/31 P |

Primary Examiner—Rodney B. Bovernick
Assistant Examiner—R. D. Shafer

[57] ABSTRACT

An improved conversion roof which includes a molded unitary roof top and a separately prepared support flange which lies flat on the van roof internally of the conversion roof; the support flange is adhesively attached to the conversion roof; and the resulting structure is bolted to the peripheral portions of the van roof with caulking gasket providing a water-tight seal. The conversion roof fitting flush with and coplanar with the sides of the van with the conversion roof being spaced slightly above the doors to permit clearance thereof during opening thereof without departing from the esthetic features of the conversion roof.

20 Claims, 6 Drawing Sheets

CONVERSION ROOF FOR VANS

BACKGROUND OF THE INVENTION

Recreational motor vehicles or small panel trucks or vans are currently made into much more comfortable vehicles for human occupancy by removing the standard metal roof and replacing it with a conversion roof which provides greater headroom inside even sufficient for persons to stand. It has been common to do this in the past to vehicles which had a sharply rounded juncture between the roof and the side wall and included a drip rail or rain gutter at that juncture. The conversion roof was made to rest along the side walls in the drip rail and thus the attachment of the conversion roof to the body of the van was relatively easy. In today's van design, however, the drip rail in many vans have been eliminated and the juncture between the roof and the side wall has been spread over a much larger zone such that there is no sharp distinction between the roof and the side wall. This design change has also permitted the tops of doors to extend into the roof line which, in turn, has caused problems in designing conversion roofs to cover the roof of the vehicle and yet not interfere with the opening and closing of doors.

It is an object of this invention to provide an improved conversion roof for the newer designs of vans. It is another object of this invention to provide a system for preparing the conversion roof to be used on vans with doors that extend into the roof line of the van. Still other objects will be apparent from the more detailed description which follows.

BRIEF SUMMARY OF THE INVENTION

This invention relates to a system for preparing a roof conversion member for a vehicular van automobile which comprises (a) preparing a peripheral flange member having a lower supporting web which rests against and conforms to the periphery of the roof of the van and an upwardly standing web for attachment to the conversion roof, the flange being positioned and shaped to be free of interference with the opening and closing of van doors;

(b) preparing a conversion roof member adapted to be joined around its periphery to the flange member;

(c) attaching a conversion roof at its periphery to the standing web by adhesive means; and (d) attaching the conversion roof with attached peripheral flange to the van roof at the lower supporting web by spaced removable fastening devices passing through the van roof and lower supporting web in a manner to produce a water-tight joint.

In preferred embodiments of this invention the peripheral flange and the conversion roof member are made of fiber glass reinforced resinous material and are adhesively attached to each other.

The invention also relates to a system for expanding the interior headroom of a vehicular van automobile which comprises (a) cutting away the van roof leaving a marginal portion around the top of all doors and windows;

(b) preparing a flange support of fiber glass reinforced resin having a V-shaped cross-section with one leg of the V adapted to lie flat on the marginal portion and the other leg projecting upwardly following the contour of the adjoining side wall of the roof, the apex of the V being spaced laterally outward from the cut away portion of the van roof;

(c) molding a unitary dish-shaped, thin walled, conversion roof member of fiber glass reinforced resin to provide the desired expanded headroom and outside contour with the inside contour at the periphery of the roof member mating with the other leg of the flange support;

(d) attaching the flange support to the conversion roof member around the periphery of the conversion roof member with the apex of the V being substantially contiguous with periphery and the other leg extending laterally inwardly of the periphery;

(e) applying a strip of caulking compound to the van roof around the marginal portion;

(f) positioning the conversion van roof and its attached flange support on the strip of caulking compound with the other leg and the marginal portion having the caulking compound sandwiched therebetween; and (g) clamping the other leg, the caulking compound, and the marginal portion together by a plurality of bolt means spaced apart around the marginal portion.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features of this invention are best appreciated by reading the following description in connection with the attached drawings.

Figure 2:
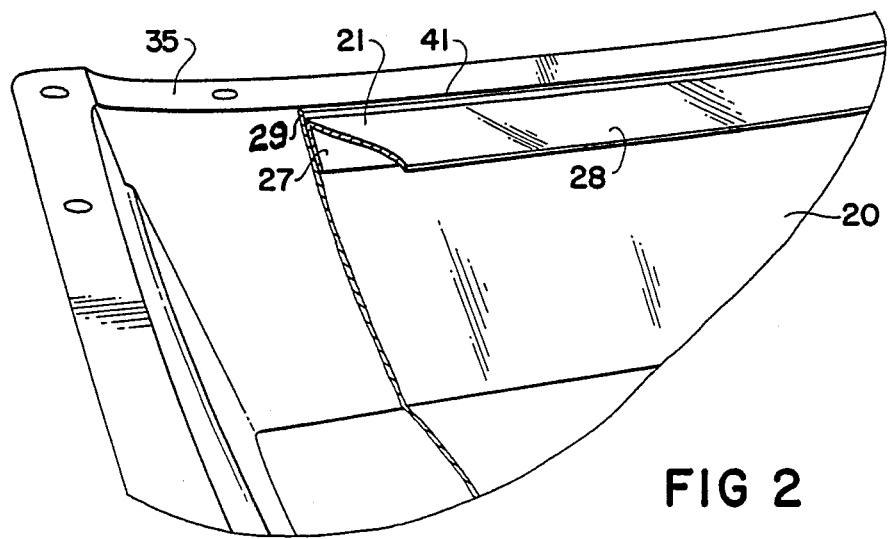
FIG. 2 is a partial enlarged view of the mold of FIG. 1 with the conversion roof therein and the support flange attached.
Figure 3:
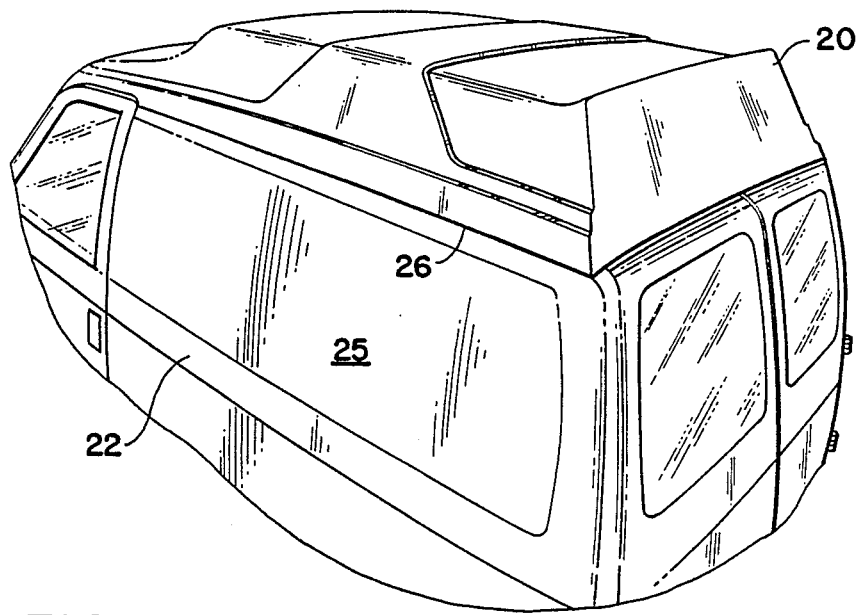
FIG. 3 is a partial perspective view of the left side of a van without drip flanges, and a van with the conversion roof of this invention attached.

In FIG. 3 there is shown a vehicular van 22, without drip flanges, to which the conversion roof 20 of this invention is attached along a juncture line 26 at the top of the side wall 25 of the van. Now referring more particularly to FIGS. 1 and 2, there are shown the two principal components of the invention; namely, the conversion roof member 20 and the peripheral support flange 21. Both of these components are preferably made of resinous material reinforced with fiber glass. Roof member 20 is made in a conventional mold 35 in which alternating layers of fiber glass and resin are laid down until the desired thickness is reached. The fiber glass may be in the form of a fabric or in the form of strands or rovings which can be distributed over a surface of resin. The resinous material is a thermosetting material conventionally used with fiber glass, such as polyester resin or the like.

The peripheral support flange 21 is prepared in four pieces, two side portions 38, a front portion 39, and a rear portion 40. After each portion has been separately prepared the four portions are placed in a jig (not shown) which support same in their proper positions in the roof member 20. Support flange 21 has a V-shaped cross-section having an acute angle between upstanding leg 27 and horizontal leg 28.

After coating the lower inside portion of roof member 20 with adhesive, the ring flange 21 is positioned and is attached to the inside of conversion roof member 20 around its periphery 41 with the upstanding leg 27 being adhesively attached to roof member 20 and with the horizontal leg 28 extending inwardly and the apex 29 of the V-shaped flange 21 being contiguous to the periphery 41 of roof member 20. It is not possible to make roof member 20 and flange 21 into a unitary article in a single molding process because of the reverse bend of horizontal leg 28. Fiber glass cannot be laid down in such a configuration in the confined locations near apex 29 nor upside down to form such leg 28. Accordingly, roof 20 and flange 21 are made separately and joined together afterward with the proper spacing and/or build-up necessary to meet the required tolerances presented by a particular van 22.

Figure 4:
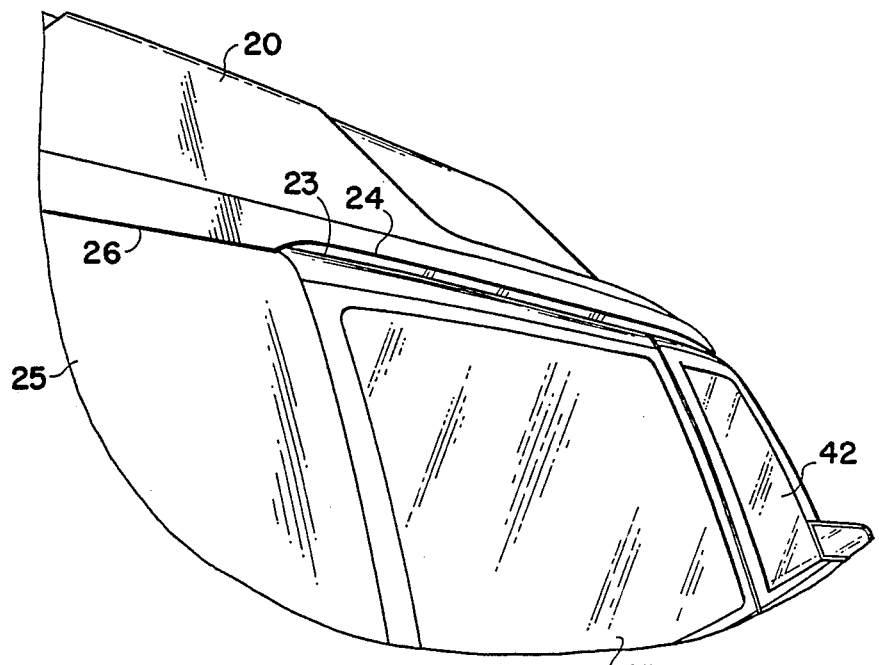
FIG. 4 is a perspective view of the right side of a van with the conversion roof attached and showing the manner of fitting the conversion roof over doors which extend into the roof line of the van.
Figure 5:
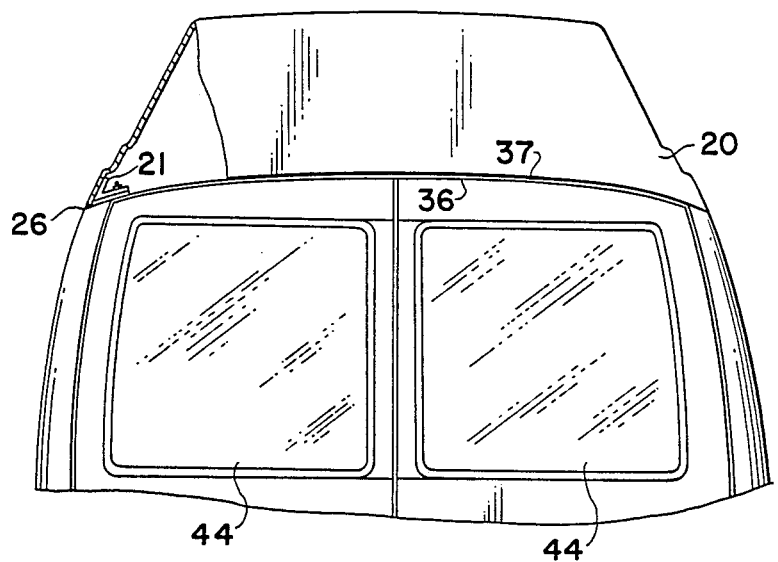
FIG. 5 is a partial enlarged rear elevational view, partially in cross-section, of a van with the conversion roof of this invention attached.
Figure 6:
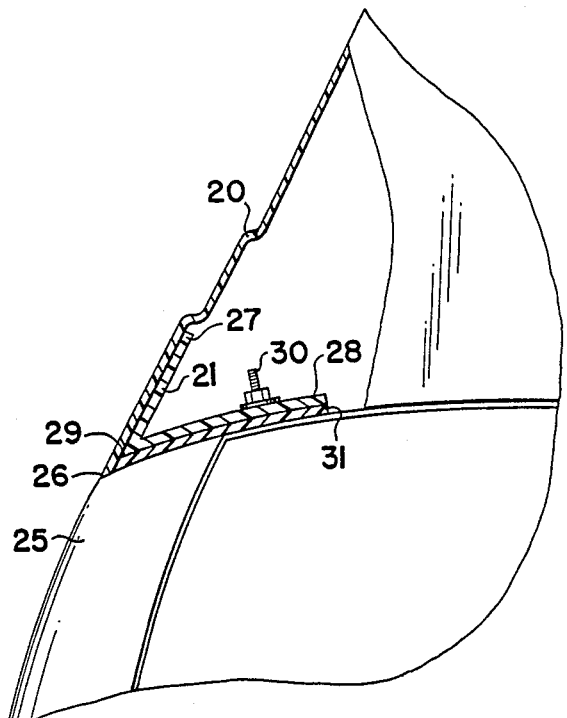
FIG. 6 is an enlarged view of the cross-sectional portion of FIG. 5.
Figure 7:
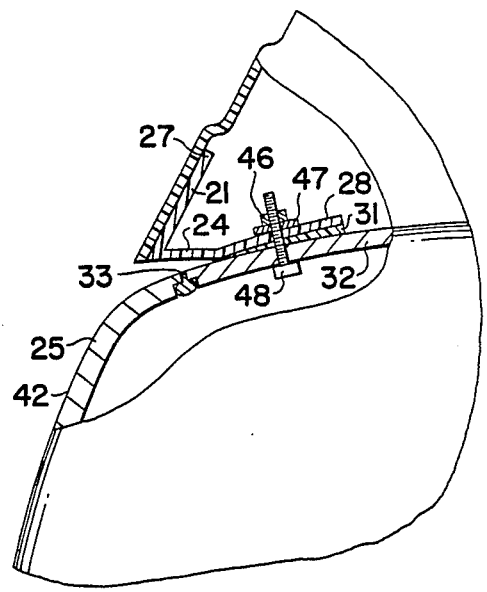
FIG. 7 is a cross-sectional view of the van and the conversion roof at the top of a door.

Some of the especially important and inventive features are shown in FIGS. 4-7. In FIG. 4 there is shown the portion of the van above a normal forwardly hinged door 42 and above a side sliding door 43. In the type of van depicted the side wall 25 and roof meet in a large rounded contour with no sharp line dividing the roof from the side wall. Consequently, the tops, including top 33 of door 42 are in the roof line of the vehicle as shown in FIG. 7. In order for the conversion roof 20 to be operable and be unobstructive with the proper opening and closing of doors 42 and 43 the bottom edge 24 of roof member 20 is shortened to be above the top edge of the doors. This is accomplished by modifying flange 21 in the cross-section of leg 28 as shown at 24 so as to increase the acute angle now formed between bridging leg portion 24 and upstanding leg 27. The normal juncture 26 between roof member 20 and the side wall 25 of the van (where there is no door) is shown in FIG. 6 to be a flush extension upward of the contour of side wall 25. If the finished color of roof member 20 and side wall 25 is identical the juncture 26 is substantially unnoticeable except under reasonably close inspection. Contrariwise when roof member 20 extends over a door, such as 42 in FIG. 7, the apex 29 of flange member 21 must be raised upwardly and away from contact with side wall 25, here formed as part of door 42, in order to provide clearance for door 42 to operate in its intended manner. This results (see FIG. 4) in the bottom edge of roof member 20 taking on the appearance of an overhanging eave, somewhat similar to an eave of a house. The V-shape of the flange 21 is modified at this joint by proper bending, during formation, of the horizontal leg 28 upwardly through portion 24. The same modification may be needed in some vans above rear doors 44, as seen in FIG. 5. The bottom edge 37 of roof member 20 is raised slightly to permit the top edges 36 of doors 44 to be opened or closed.

It is a special benefit of this invention that the conversion roof does not rely upon a drip rail or rain gutter for support as in U.S. Pat. No. 4,575,148, dated Mar. 11, 1986. The conversion roof of this invention is attached to the van by a plurality of spaced bolt means 30 in the form of bolt 48, washer 47, and lock nut 46, which clamp horizontal leg 28 of support flange 21 to the marginal strip 32 of the van roof with a strip of caulking composition 31 sandwiched between so as to provide a water-tight joint. Caulking composition 31 may be a preformed gasket material of a mastic composition, a rubbery material, or the like. Caulking composition 31 may also be a thick pasty composition which is applied as a paste and dries to a solid, but may remain flexible or resilient. A combination of both a preformed gasket material and the pasty caulking compound may also be used.

The roof body 20, after it has been molded, is prepared by removing any and all slag from its open perimeter and the open edge is trimmed as necessary. From the open edge down a predetermined distance, about four inches, the inside surface is ground to remove the residual surfacing agents present in all FRP polyester resins.

Figure 1:
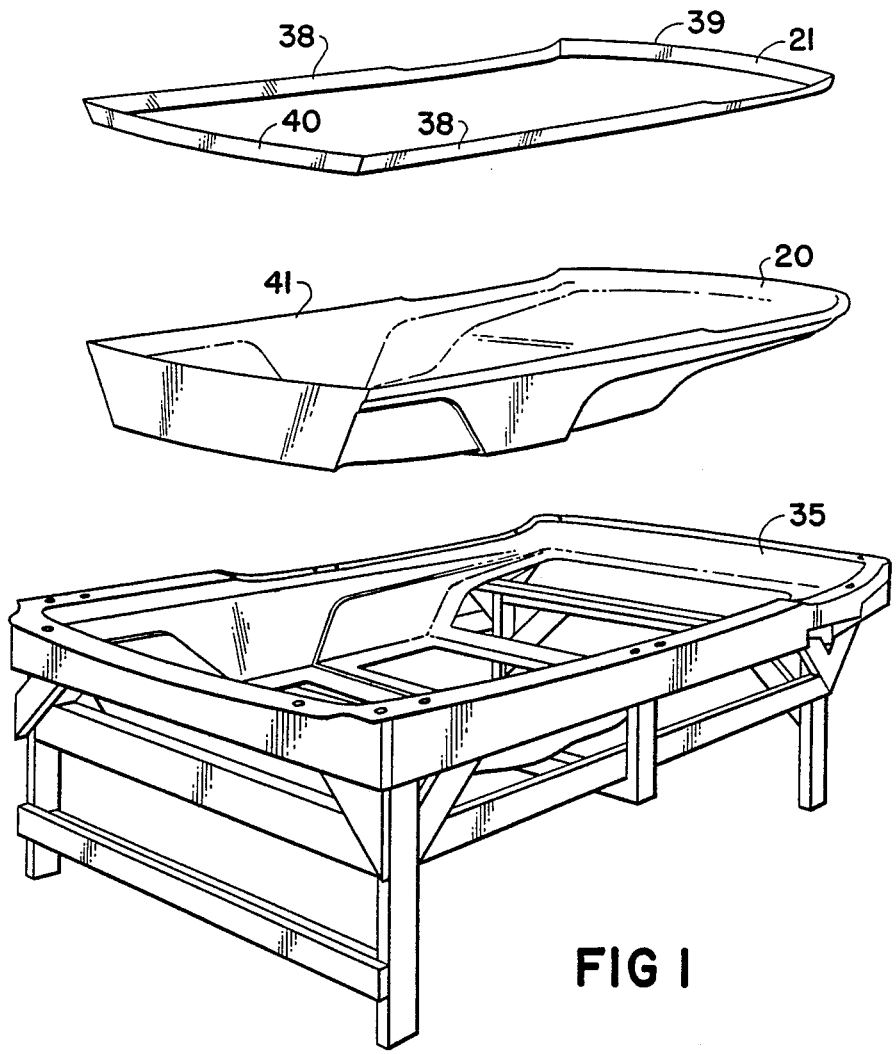
FIG. 1 is an exploded perspective view of the mold in which the conversion roof of this invention is prepared, and also showing the molded conversion roof and the peripheral support.
Figure 8:
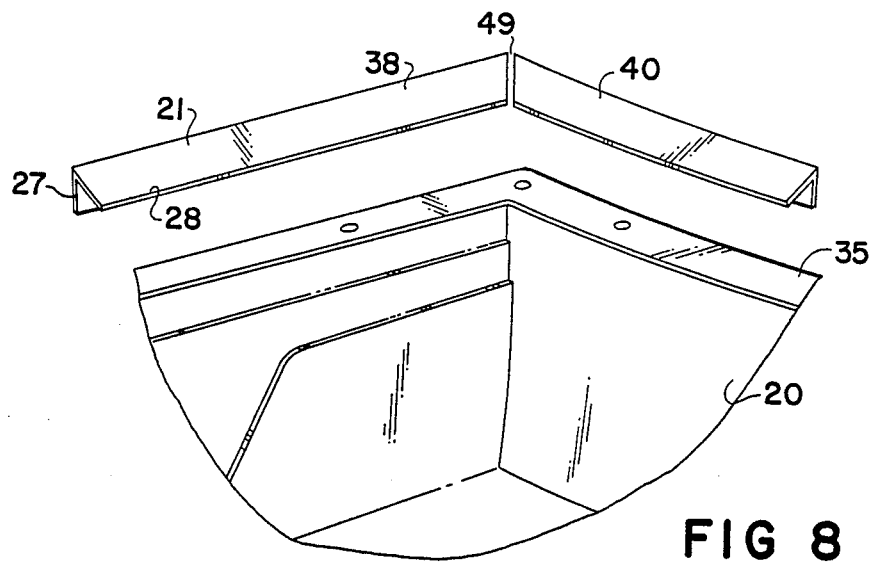
FIG. 8 is an exploded perspective view of one corner of the mold with the conversion roof body in the mold and the support flanges ready to be fitted thereto.
Figure 9:
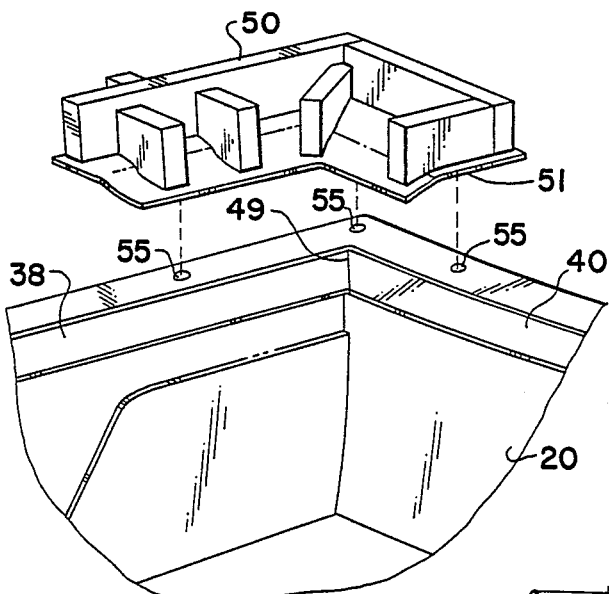
FIG. 9 is an exploded perspective view similar to FIG. 8, and showing a corner jig ready to be attached thereto.
Figure 10:
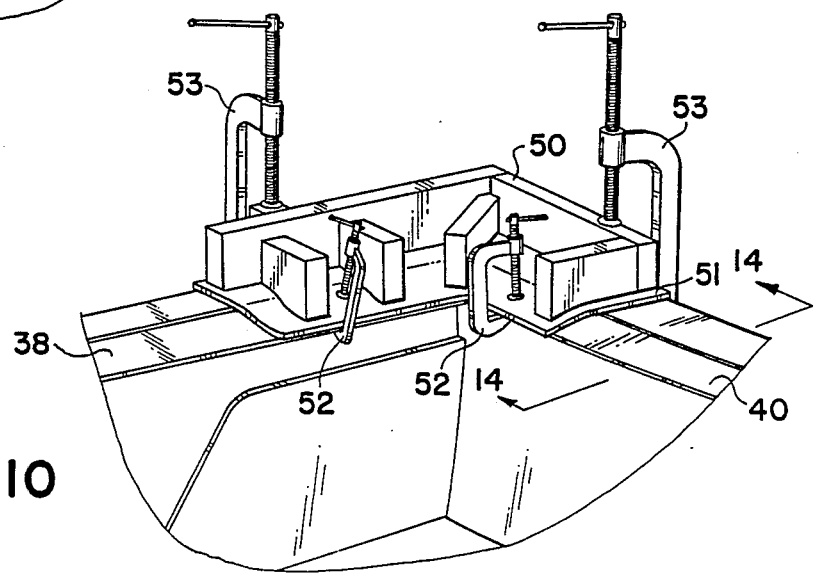
FIG. 10 is a perspective view as in FIG. 9 with the jig attached to the flanges and to the mold.
Figure 11:
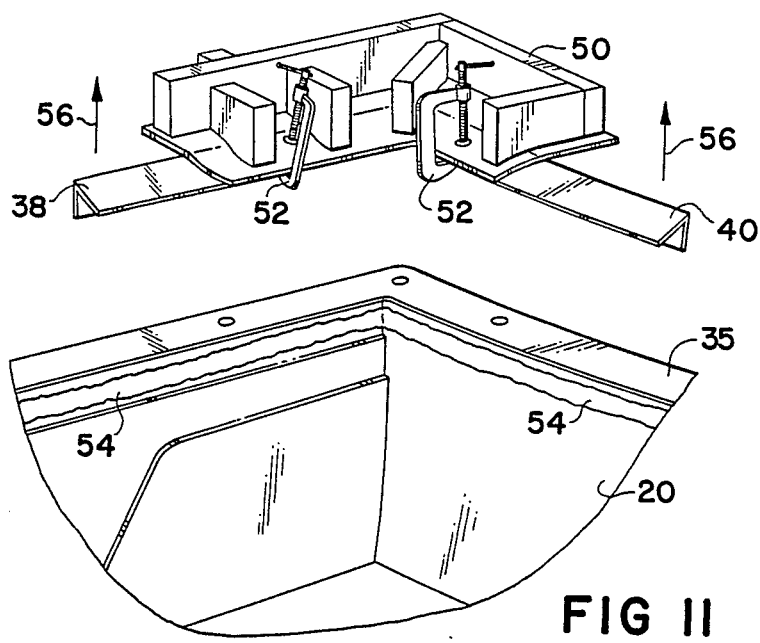
FIG. 11 is an exploded perspective view showing removal of the jig and the fitted support flange as illustrated in FIG. 1.
Figure 12:
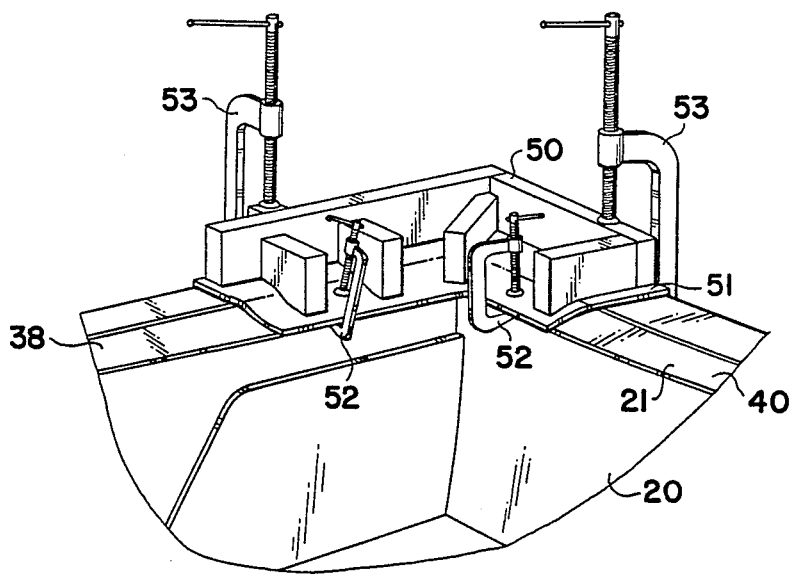
FIG. 12 is a perspective view of the arrangement in FIG. 11 with the jig and the supporting flange held in place for adhesive bonding to the roof body.
Figure 13:
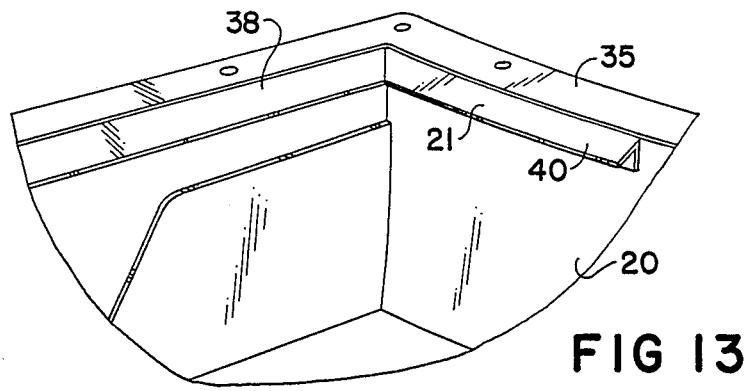
FIG. 13 is a perspective view of the conversion roof body, as shown in FIG. 8, but with the supporting flange bonded thereto.
Figure 14:
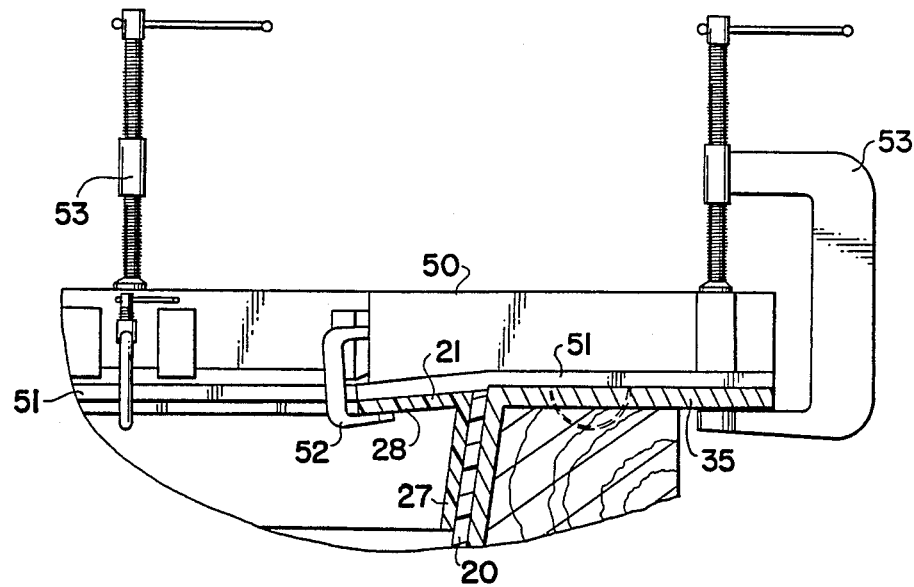
FIG. 14 is a cross sectional view taken along line 14—14 of FIG. 10.

In the preparation of the conversion roof of this application the dish shaped roof body 20 is formed in mold 35 and the support flange 21 is prepared in four pieces, two side portions 38, a front portion 39, and a rear portion 40. These portions are fitted together by mitering at the corners as at 49 in FIG. 8. After all edges are trimmed to remove rough edges and the bonding surface of each of the portions 38, 39, and 40 is ground, they are placed in their perspective desired position inside the molded roof body 20 in mold 35 and jig 50 is positioned so that its base plate 51 fits precisely over the contour of joined portions 38 and 40 around corner 49. Preferably jig 50 is positioned precisely by means of inletting pins or dowels projecting downwardly from base plate 51 to fit into holes 55 on the edges of mold 35. Small C-clamps 52 connect the horizontal leg 28 of flange 21 to base plate 1. Large C-clamps 53 connect jig 50 to mold 35. The use of these clamps 52 and 53 makes it possible to precisely fit flange 21 (including portions 38 and 40) to roof body 20. After the positioning of flange portions 38 and 40 is adjusted to the proper position as shown in FIG. 10, large C-clamps 53 are loosened and the combination of flange portions 38 and 40 and four jigs 50 is lifted away from mold 35 in the direction of arrow 56. While FIG. 11 shows only one corner where flanges 38 and 40 are joined, it is to be understood that the structure lifted in FIG. 11 includes four flange portions 38, 39, and 40, as shown in FIG. 1, held together at all four corners of the support flanges 21 by a jig 50 at each corner and C-clamps 52. While the support flange 21, jigs 50, and C-clamps 52 are removed from conversion roof body 20, a band of appropriate adhesive or bonding agent 54 is applied around the interior of roof body 20 where vertical leg 27 of flange 21 is to be attached to roof body 20. In FIG. 12 the combination of flange 21, jigs 50, and C-clamps 52 are returned to the proper position inside the perimeter of roof body 20, and large C-clamps 53 are fastened in place to hold the structure in place until the adhesive solidifies and cures. Any excess adhesive 50 which is squeezed out (particularly upwardly) is removed prior to any solidification so that grinding and/or priming is minimized. The jigs 50 and C-clamps 52 and 53 are then removed to leave the conversion roof body 20 with flange 21 attached and ready to be attached to a van roof.

A suitable straight jig, not shown but corresponding to one leg of the corner jig 50, may be secured midway of each side flange portion 38 to position same accurately in the bonding process, as will be understood with reference to FIG. 1.

In the general system of converting a van roof to the improved roof of this invention (a) the original roof is cut away by an acetylene torch or by a saw to leave a marginal strip 32 around the tops of the side walls and around the tops of the doors, and around the tops of the windows;

(b) a dish shaped thin walled shell 20 of fiber glass reinforced resin is molded to conform to the shape desired and to fit around the marginal strip 32 and appear to be an upward extension of the side walls of the van;

(c) a support flange 21 is made by molding four V-shaped strips of fiber glass reinforced resin to lie on the marginal portion 32 of the van roof leaving clearance for all doors to open and close, and the four pieces are then clamped together to form a continuous ring 21 supported into the shell 20 by a jig;

(d) the support flange ring 21 is adhesively attached to the periphery 41 of the molded conversion roof member 20 by bonding the upstanding leg 27 of the V-shaped support flange 21 to the inside surface of roof member 20 so that the apex 29 of the V is contiguous with the peripheral edge 41 of roof member 20;

(e) a strip of caulking composition 31 is then placed on the top of marginal strip 32 of the van roof;

(f) the conversion roof member 20 with support flange 21 attached is positioned on the strip of caulking composition 31 so that all juncture 26 of the roof member 20 and side walls 25 are as perfectly matched as possible; and (g) holes are drilled at spaced locations through marginal strip 32, caulking strip 31, and horizontal leg 28 of support flange 21 and bolt means 30 are placed through the holes and drawn tight to clamp conversion roof 20 in place.

While the invention has been described with respect to certain specific embodiments, it will be appreciated that many modifications and changes may be made by those skilled in the are without departing from the spirit of the invention. It is intended, therefore, by the appended claims to cover all such modifications and changes as fall within the true spirit and scope of the invention.

What is claimed as new and what is desired to be secured by Letters Patent of the United States is:

1. A system for preparing a conversion roof member for a vehicular van having a roof, a windshield doors and sidewalls which comprises:
   (a) a peripheral flange member made of a thermosetting resinous material having a lower supporting web which rests against said conforms to the periphery of the roof of the van and an upwardly standing web for attachment to the conversion roof, said flange member being positioned and shaped to be free of interference with the opening and closing of the doors of the van;
   (b) a conversion roof member to be joined around its periphery to said flange member;
   (c) adhesive means for attaching said conversion roof member at its inside periphery to said standing web without any attachment extending through said conversion roof member and without any moulding to cover same; and
   (d) attaching means for said conversion roof member extending through only said lower supporting web and the roof of the van at spaced locations thereabout in a manner to produce a water-tight joint, said attaching means positioning the lower edge of said conversion roof member very closely adjacent the roof of the van so that the joint there between is substantially unnoticeable.

2. The system of claim 1 wherein said attaching means includes a plurality of removable fastening devices.

3. The system of claim 2 wherein said removable fastening devices are threaded bolts and nuts.

4. The system of claim 1 wherein said peripheral flange member is prepared by molding separately two lengthwise flange portions to fit along the two sides of said roof of the van, a forward lateral flange portion to fit above the windshield of the van, and a rear lateral flange portion to fit across the back of said roof of the van, and positioning all four flanges portions to make a unitary peripheral flange within said conversion roof member 5. The system of claim 1 wherein said peripheral flange member is made of fiber glass reinforced resin.

6. The system of claim 1 wherein said conversion roof member is molded in a single unitary structure from fiber glass reinforced resin.

7. The system of claim 1 further comprising caulking composition means between said lower supporting web of said peripheral flange member and said roof of the van for sealing said flange member to said roof of the van.

8. The system of claim 1 wherein said peripheral flange member has a cross-section in the shape of a sharp pointed V having an acute angle between the legs of the V.

9. The system of claim 8 wherein said conversion roof member and the adjoining side wall of the van meet in a substantially indistinguishable joint at all areas except over the van doors each of which includes a top edge which is located in the roof of the van and the van being without a drop rail.

10. The conversion roof member for a vehicular can having a roof comprising a thin walled unitary and dish shaped shell of fiber glass reinforced resinous material, a continuous V-shaped flange member of fiber glass reinforced resinous material having a vertical leg only adhesively attached to the inside of said shell without any attachment extending through said shell and a horizontal leg directed laterally inwardly with the apex of said flange member being parallel with the internal wall of said shell, said horizontal leg being adapted to be rigidly connected to a van roof in a manner to produce a water-tight joint.

11. The combination of the conversion roof member of claim 10, the van with the central roof section cut away to form an enlarged top opening, a strip of caulking compound between said roof of the van and said flange member adjacent to and around said top opening, and spaced bolt means extending through said flange member and caulking compound and van roof for holding said conversion roof member tightly against said strip of caulking compound and said roof of the van.

12. A system for expanding the interior headroom of a vehicular van having sidewalls which comprises
   (a) a van roof with a central portion cut away leaving a marginal portion around the tops of all doors and windows of said van;
   (b) a peripheral flange support of fiber glass reinforced resin having a V-shaped cross-section with one leg of the V positioned to lie flat on said marginal portion and its other leg projecting upwardly following the contour of the adjoining side wall of said van, the apex of the V being spaced laterally outward from said cut away portion of said roof of the van;
   (c) a unitary dish-shaped, thin walled, conversion roof member of fiber glass reinforced resin to provide the desired expanded headroom and outside contour generally being coextensiv with said sidewalls of the van with the inside contour at the periphery of said conversion roof member mating with said other leg of said flange support;
   (d) only adhesive means for attaching said flange support to said conversion roof member around the periphery of said conversion roof member without any attachment extending through said conversion roof member, said apex of said flange support being substantially contiguous with said periphery and said other leg extending laterally inwardly of said periphery;
   (e) a strip of caulking compound applied to said van roof around said marginal portion;
   (f) said conversion roof member and its attached flange support being positioned on said strip of caulking compound with said other leg and said marginal portion sandwiching therebetween said caulking compound; and
   (g) clamping means engaged with said other leg and said marginal portion for maintaining said conversion roof member and its said flange support firmly on said van roof in a water-tight manner.

13. The system of claim 12 wherein said clamping means includes a plurality of spaced fastening devices extending through said other leg, said caulking compound and said marginal portion.

14. The system of claim 12 wherein said van is without any drip rail, said van having doors that extend into the zone of said roof of said van.

15. The system of claim 14 wherein said flange support is shaped to fit above tops of said doors that extend into said marginal portion of said roof of said van and wherein said other leg of the v is modified to position said apex upwardly and be spaced away from said tops of said doors to permit opening of said doors.

16. A method for making a conversion roof to be attached to the roof of a vehicular van which comprises:
   (a) preparing a dish-shaped conversion roof body of fiber glass reinforced resin in a suitable dish-shaped open mold;
   (b) preparing four angle flanges having a V-shaped cross section from fiber glass reinforced resin positioned to fit around the inside perimeter of the conversion roof body and to lie along the corresponding contours of the van roof;
   (c) cutting and smoothing the edges of all the flanges to form a four-piece continuous peripheral flange ring around the inside of the conversion roof body with mitered joints at four corners of the flange ring;
   (d) locating the four angled flanges at their desired positions in the conversion roof body and connecting the four angled flanges together by appropriate corner jigs and clamping devices at each of the four corners of the flange ring to form a continuous peripheral flange ring;
   (e) providing bonding material between the flange ring and the corresponding periphery of the conversion roof body to integrally affix same without any attachment means extending through the conversion roof body; and
   (f) removing the corner jigs and clamping means to recover the conversion roof member with the continuous flange ring attached thereto.

17. The method of claim 16 further comprising the steps of:
   (g) removing the ocntinuous peripheral flange ring from the conversion roof body prior to step (e), step (e) including applying the bonding material to the inside of the conversion roof body at a location previously engaged by the continuous peripheral flange ring;
   (h) returning the continuous peripheral flange ring to its position within the conversion roof body in engagement with the applied bonding material.

18. The method of claim 17 further comprising the step of:
   (i) clamping each of the corner jigs to the open mold after step (h) to cause the flange ring to be forced into intimate contact with the bonding material to accurately affix the flange ring to the roof body.

19. The method of claim 16 further comprising the step of:
   (g) clamping each of the corner jigs to the open mold prior to step (e).

20. The method of claim 19 further comprising the step of:
   (h) applying straight jigs midway of the side angled flanges which are elongated and clamping the straight jigs to the open mold prior to step (e).

* * * * *